United States Patent
Dubarry et al.

(10) Patent No.: US 9,547,212 B2
(45) Date of Patent: Jan. 17, 2017

(54) ELECTROCHROMIC DEVICE COMPRISING AN INTEGRATED HEATING SYSTEM

(71) Applicant: Commissariat a l'Energie Atomique et aux Energies Alternatives, Paris (FR)

(72) Inventors: Christophe Dubarry, Claix (FR); Sami Oukassi, Saint Egreve (FR)

(73) Assignee: Commissariat A L'Energie Atomique et aux Energies Alternatives (FR)

( * ) Notice: Subject to any disclaimer, the term of this patent is extended or adjusted under 35 U.S.C. 154(b) by 0 days.

(21) Appl. No.: 14/800,233

(22) Filed: Jul. 15, 2015

(65) Prior Publication Data

US 2016/0018713 A1 Jan. 21, 2016

(30) Foreign Application Priority Data

Jul. 16, 2014 (FR) ...................................... 14 56846

(51) Int. Cl.
*G02F 1/15* (2006.01)
*G02F 1/153* (2006.01)

(52) U.S. Cl.
CPC ............. *G02F 1/1525* (2013.01); *G02F 1/153* (2013.01); *G02F 1/1523* (2013.01); *G02F 1/1533* (2013.01); *G02F 2001/1536* (2013.01)

(58) Field of Classification Search
CPC ...... G02F 1/1525; G02F 1/1523; G02F 1/153; G02F 1/1533; G02F 2001/1536; G02F 1/155

USPC .................................. 359/265–275; 429/400
See application file for complete search history.

(56) References Cited

U.S. PATENT DOCUMENTS

| 6,094,292 | A | 7/2000 | Goldner et al. | |
| 6,747,779 | B1 | 6/2004 | Morin et al. | |
| 7,265,890 | B1 | 9/2007 | Demiryont | |
| 8,173,320 | B2 * | 5/2012 | Takata ................. | H01M 8/0206 429/457 |
| 8,551,656 | B2 * | 10/2013 | Sabi ........................ | C01B 25/45 429/220 |
| 8,722,234 | B2 * | 5/2014 | Oukassi ................ | H01M 2/204 29/623.1 |
| 2007/0002422 | A1 | 1/2007 | O'Shaughnessy | |
| 2013/0130107 | A1 * | 5/2013 | Uchida ................. | H01M 4/626 429/211 |

FOREIGN PATENT DOCUMENTS

FR 2913972 A1 9/2008

* cited by examiner

*Primary Examiner* — Tuyen Tra
(74) *Attorney, Agent, or Firm* — St. Onge Steward Johnston & Reens, LLC

(57) ABSTRACT

An electrochromic device including an electrochromic stack and a support, the electrochromic stack successively including: a first current collector; a first electrochromic electrode; an electrolyte; a second electrochromic electrode; a second current collector. The support and the electrochromic stack are separated by a dielectric layer and a heating system in contact with the support. Further, the heating system is sized to modify at least one of the optical characteristics of the electrochromic device.

13 Claims, 3 Drawing Sheets

ELECTROCHROMIC DEVICE COMPRISING AN INTEGRATED HEATING SYSTEM

FIELD OF THE INVENTION

The present invention relates to an electrochromic device comprising an electrochromic stack supported by an internal heating system.

The field of use of the present invention particularly relates to screens, display devices, active glass, and aeronautics.

BACKGROUND OF THE INVENTION

Generally, an electrochromic device is capable of modulating the optical properties (transmittance and/or reflectance and/or absorbance) when an electric field is applied thereacross. More specifically, it comprises at least one active electrochromic electrode capable of ensuring a reversible change of optical state on application of an electric charge.

A conventional electrochromic device generally comprises a support successively supporting (FIG. 6):
a first current collector (4);
a first electrochromic electrode (11);
an electrolyte (12);
a second electrochromic electrode (13); and
a second current collector (6).

At least one of the electrochromic electrodes is optically active. It enables to modulate the optical properties of an electromagnetic radiation applied to the device. Such an optical state switching is obtained by application of an electric field across the electrochromic device.

The used electrochromic materials may be organic, inorganic, or hybrid. Their nature enables to pass from one optical state to another by insertion or deinsertion of cations. Such a cation transport is easier when the cations are small; they generally are protons ($H^+$) or lithium ions ($Li^+$).

As already indicated, the change of optical state is triggered by application of an electric field across the electrochromic device; this property enables to modulate the reflection and the transmission of an electromagnetic radiation having a wavelength which may vary according to the range of application. Thus, the visible UV range may correspond to applications of electrochromic window type, while the infrared range may correspond to an application of heat management type.

As already indicated, electrochromic devices comprise two electrochromic electrodes. Typically, the second electrochromic electrode enables to store cations. It may be transparent (optically passive), whatever the cation flow. It may also act as a complementary electrode and have an optical state (transparent, colored . . . ) identical to that of the first electrode but with an inverse cation flow.

Electrochromic devices having this second type of configuration (complementary electrode) are generally preferred, given that they improve the optical perception of the change of optical state (contrast). For example, the first electrode may be made of a $WO_3$ material while the second electrode may be made of NiO. This couple of materials allows the following electrochemical reactions:

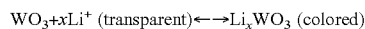

$WO_3 + xLi^+$ (transparent) $\leftarrow\rightarrow Li_xWO_3$ (colored)

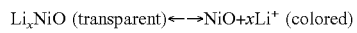

$Li_xNiO$ (transparent) $\leftarrow\rightarrow NiO + xLi^+$ (colored)

Generally, electrochromic materials allow a reversible bistable change of optical state when a voltage is applied across the electrochromic device. In other words, such materials have two steady states, and require no power input to be maintained in one of the two states.

The performance of electrochromic devices is particularly assessed by means of the following indicators:
- contrast: the difference between the maximum and the minimum of the optical response of the device. The higher the contrast, the more effective the device is considered.
- optical density: the quantity of charges to be brought to the system to switch, that is, to pass from the minimum state to the maximum state or conversely. For an equal charge, the greater the optical transformation, the more effective the device is considered.
- switching time: the time necessary for the device to ensure the passing from one optical state to another, which is fixed for a given contrast. The shorter the switching time, the more effective the device is considered.

All-solid electrochromic devices operating by insertion of cations ($Li^+$ for example) within inorganic materials may have relatively long switching times. Indeed, $Li^+$ cations are less mobile than protons. Further, an all-solid electrolyte has a lower ion conductivity than a liquid electrolyte. Accordingly, the cation migration kinetics is slower, which lengthens the switching time.

As an example, document U.S. Pat. No. 7,265,890 describes an all-solid inorganic electrochromic device operating by insertion of $Li^+$ cations in the infrared range. It comprises a first electrochromic electrode, an electrolyte, and a second transparent electrochromic electrode behaving as an $Li^+$ cation storage electrode.

Such an electrochromic device is typical of prior art configurations. The second electrochromic electrode is a transparent cation storage electrode, which is thus optically passive. Generally, it has a cation storage capacity larger than that of the first electrochromic electrode forming the active electrode.

Typically, the quantity of cations ($Li^+$ for example) injected into the storage electrode corresponds to the maximum capacity of cations which can be reversibly inserted into the available thickness and de-inserted therefrom.

The saturation of the storage electrode enables to compensate for a possible loss of cations during the cycling (insertion irreversibility). It further enables to improve the chemical stability of the device by anticipating the possible oxidation of part of the cations, which might cause a failure of the device.

Anyhow, prior art electrochromic devices are generally not compatible with a use in extreme temperature conditions, given that the temperature of use has an effect on the contrast and the switching time.

The present invention provides solving this technical problem due to the use of electrochromic devices at negative temperatures.

SUMMARY OF THE INVENTION

The present invention relates to an electrochromic device comprising a heating system which makes it compatible with a use in low-temperature conditions, for example, in the order of −50° C.

More specifically, the present invention relates to an electrochromic device comprising an electrochromic stack and a support, said electrochromic stack successively comprising:
a first current collector;

a first electrochromic electrode;
an electrolyte;
a second electrochromic electrode;
a second current collector.

According to the invention, the support and the electrochromic stack are separated by a dielectric layer and a heating layer in contact with the support.

This heating system integrated to the electrochromic devices enables to maintain the operating characteristics substantially constant whatever the outside temperature. In other words, the kinetics of the change of optical state (modification of the incident electromagnetic radiation) is substantially constant whatever the temperature of use of the electrochromic device.

At least one of the two electrochromic electrodes of the device is optically active on application of an electric field across the electrochromic device. Such an optically-active electrochromic electrode is responsible for the change of optical state enabling the electrochromic device to modify the optical properties of an electromagnetic radiation.

According to a preferred embodiment, the electrochromic device successively comprises:
 a support;
 a heating system;
 a dielectric layer;
 a first current collector;
 a first optically-active electrode;
 an electrolyte;
 a second optically-passive electrode;
 a second current collector.

According to another embodiment, the configuration of the electrochromic stack may be inverted. In other words, the electrochromic device may successively comprise:
 a support;
 a heating system;
 a dielectric layer;
 a second current collector;
 a second optically-passive electrode;
 an electrolyte;
 a first optically-active electrode;
 a first current collector.

The two current collectors are connected to an electric current source enabling the electrochromic device to operate.

Further, the heating system is sized to modify at least one of the optical characteristics of the electrochromic device.

Electrochromic electrodes are advantageously cation or proton ($H^+$) insertion electrodes. The cations used may be metal cations, particularly alkaline metal cations such as $Li^+$, $K^+$, or $Na^+$, advantageously $Li^+$.

The current collectors are advantageously made of transparent material.

Transparent material (current collector, electrolyte, dielectric substrate . . . ) means a material transparent to the electromagnetic radiation, having its properties modulated by the electrochromic device. It may in particular be the visible and/or infrared spectral range (from 0.2 to 20 micrometers).

The current collectors enable to homogeneously apply an electric voltage to the electrochromic stack.

The (first and second) current collectors are, advantageously and independently from each, other made of a material capable of being selected from the group comprising TCO (transparent conductive oxides) such as AZO (aluminum zinc oxide) or ITO indium tin oxide); electronically transparent conductive oxides (TCO), particularly $SnO_2$, $F:SnO_2$, $In_2O_3$, $ZnO$; metals such Cu, Mo, W, and Ta; and graphene.

The (first and second) current collectors may in particular appear, independently from each other, in the form of a grid, of a continuous layer (film), or of a discontinuous layer.

The current collectors may have a thickness advantageously in the range from 2 to 1,000 nanometers, more advantageously from 5 to 200 nanometers. Their thickness may in particular be in the order of 10 nanometers.

The materials forming the (first and second) electrochromic layers preferably are metal oxides, such as, in particular $WO_3$; $NiO$; $NiWO_3$; or $V_2O_5$.

It will be within the abilities of those skilled in the art to select the material adapted to form an optically-active electrode ($WO_3$, for example), or possibly an optically-passive electrode ($V_2O_5$, for example).

The electrochromic electrodes have a thickness, advantageously and independently from each other, in the range from 50 to 1,000 nanometers, more advantageously from 100 to 500 nanometers.

As already indicated, the electrochromic electrodes are separated by an electrolyte.

According to an advantageous embodiment, the electrolyte is made of a transparent material. It may in particular be made of a material selected from the group comprising $Ta_2O_5$; $LiAlF_4$; $Li_3N$; $SiO_x$; $CaF2$; $LiTaO_3$; $LiPO_2$; $Li_3PO_4$; and also an oxynitride such as LiPON (lithium phosphorus oxynitride).

The above-described electrochromic device also comprises a heating system positioned between the support and a dielectric layer. The dielectric layer separates the heating system from the electrochromic stack.

The dielectric layer, advantageously transparent, is made of a material capable of being selected, in particular, from the group comprising $SiO_2$; SiN; $TiO_2$; AlN; and $Al_2O_3$.

The dielectric layer has a thickness which may advantageously be in the range from 0.1 and 100 micrometers, and more advantageously still from 0.2 to 2 micrometers.

The dielectric layer is in contact with the heating system.

The heating system is advantageously capable of letting through the electromagnetic radiation having its optical properties modified by the use of the electrochromic device according to the invention. It is thus advantageously transparent.

According to a specific embodiment, the heating device is partially transparent to infrared and/or ultraviolet radiation.

As already indicated, the heating device is sized to modify at least one of the optical characteristics of the electrochromic device.

It may appear in the form of a continuous layer or of a structured layer.

In the case of a continuous layer, its thickness is advantageously in the range from 2 to 40 nanometers, more advantageously from 5 to 10 nm. It may be a continuous monolayer or a large number of layers (continuous multilayer).

The structured heating elements (structured monolayer or structured multilayer) may have different forms. It may in particular be a grid, interconnected lines, or pads interconnected by an electric conductor, particularly round or parallelepipedal pads.

Said lines are interconnected by an electric conductor, advantageously by metal wires, TCO (transparent conductive oxide) wires, or wires made of semiconductor material.

Said pads are also interconnected by an electric conductor, advantageously by metal wires, TCO (transparent conductive oxide) wires, or wires made of semiconductor material.

The thickness of the lines or of the pads may be different from that of the interconnects between lines or between pads.

The structured heating system (grid, lines, pads), particularly in the case of a grid, has a thickness advantageously in the range from 50 to 5,000 nanometers, more advantageously from 100 to 500 nanometers.

Further, the heating system in the form of a grid, of lines, or of pads has a line or pad width advantageously in the range from 0.2 to 20 micrometers, more advantageously from 5 to 10 micrometers.

The space between lines (grid, lines, or space between pads) is advantageously in the range from 20 to 2,000 micrometers, more advantageously from 50 to 200 micrometers.

The thickness/space between lines ratio is advantageously in the range from 0.2 to 50.

Generally, the heating system is advantageously made of a material capable of being selected from the group comprising metals such as, in particular, Cr, Ni, NiCr, Ta, W, Mo, Pt; nitrides such as, in particular, TiN, TiAlN, TaN; $RuO_2$; bismuth ruthenate; and bismuth iridate.

The heating system may also have a function of antireflection or diffuse reflection by the structure patterns forming it. Such a structuring is materialized by the grid, line, or pad network present in the heating element.

Apart from its heating function, the heating system may generate one or a plurality of optical function(s) such as optical diffusion and/or diffraction, for example. This effect is obtained by controlling the sizing of the heating system, particularly when it is a structured layer or a structured multilayer, for example, a grid.

Generally, the control of the sizing of the heating system is obtained by means of calculation methods such as for example, "FDTD" (Finite Element Time Domain) or "RCWA" (Rigorous Coupled Wave Analysis), which use the resolution of the Maxwell equations to size an optical component (J. B. Chou, Optic Express, 2014 vol. 22 (S1) p. A144; Liping Wang, Optics Express, 2013 vol. 21 (S6) p. A1078).

In the present invention, the dimensions of the heating system enable to act or not on the light wave (transmission, diffusion, diffraction, absorption). Such optical properties, at a given wavelength, depend on the physical dimensions of the heating system, for example, in the case of a grid: the line width, the line height, and the distance between lines. Thus, it will be within the abilities of those skilled in the art to form a heating system (for example, a grid) having optical properties optimized for one of the selection criteria (transmission, diffusion, diffraction, or absorption).

According to a preferred embodiment, the heating system appears in the form of a structured layer or of a structured multilayer, to provide an optical diffusion and/or diffraction.

The reflection is called diffuse when the light is reflected in a large number of directions and the energy of the incident radiation is redistributed into a large number of reflected rays. Such a diffusion enables to create, in the simplest possible way, an orthotropic optical reflection (an orthotropic light source is an angularly-uniform light source, that is, having the same luminance in all directions).

Indeed, in the case of a structured heating system, the material forming it may be either transparent, or partially transparent. The structuring may thus ensure an optical diffusion function, deviating the incident optical wave in different directions.

The structured heating system can thus have an optical effect. The heating system is then sized so that the structuring also meets the criteria of achievement of the optical diffusion function. It may in particular appear in the form of a structured monolayer or of a structured multilayer to provide an optical diffusion and/or diffraction.

The heating system rests on the support, which is advantageously transparent.

The support may be flexible or rigid, and advantageously made of a material capable of being selected from the group comprising polymeric supports, such as, in particular, PET (poly(ethylene terephthalate)), polyester, PEN (poly ethylene naphthalate); and inorganic supports such as, in particular, glass, silica, silicon, germanium, $BaF_2$, sapphire, ZnS, and ZnSe.

Due to its components and to their thickness, the electrochromic device according to the present invention may be rigid or flexible. It may further comprise an encapsulation layer covering the electrochromic stack.

This encapsulation layer is made of a transparent material, advantageously an organic material such as epoxy resin and/or an inorganic material such as $Al_2O_3$, $SiO_2$, $TiO_2$.

It has a thickness advantageously in the range from 1 to 10 micrometers.

The electrochromic device according to the invention may have one of the following configurations:
   superstrate: the support of the device corresponds to the surface which is exposed to an electromagnetic radiation having its properties modified by the electrochromic device. The support is transparent to electromagnetic radiation.
   substrate: the electrochromic stack is covered with an encapsulation layer. The encapsulation layer corresponds to the surface of the device which is exposed to an electromagnetic radiation having its properties modified by the electrochromic device. It is transparent to electromagnetic radiation.
   dual: the electrochromic stack is covered with an encapsulation layer which is made of a material identical to the material forming the support. This encapsulation layer corresponds to the surface of the device which is exposed to an electromagnetic radiation having its properties modified by the electrochromic device. It is transparent to electromagnetic radiation.

The electrochromic device according to the invention has the following advantages over prior art devices:
   operating temperature capable of reaching −50° C., due to the presence of the integrated heating system.
   wider fields of use due to the operating temperature that can be envisaged: aerospace and certain terrestrial geographic locations.
   substantially constant optical switching dynamics whatever the temperature of use.
   modification of the optical switching time.
   optimization of the device performance in terms of optical contrast, transmission, and reflection. The integrated heating system may have an optical diffusion function.

The present invention also relates to the use of the electrochromic device with a heating system integrated in the display, electrochromic displays, smart glass (building, mobile object, clock and watch making), but also structures having a controlled emissivity for spatial and aeronautical applications.

The present invention also relates to the method of manufacturing the electrochromic device with an integrated heating system. The method comprises the steps of:
- forming a heating system on a support;
- depositing a dielectric layer on the heating system;
- forming an electrochromic stack such as described hereabove, on the dielectric layer.

The invention and the resulting advantages will better appear from the following non-limiting drawings and examples, provided as an illustration of the invention.

DETAILED DESCRIPTION OF THE INVENTION

The present invention relates to an electrochromic device comprising an integrated heating system.

Figure 1A:
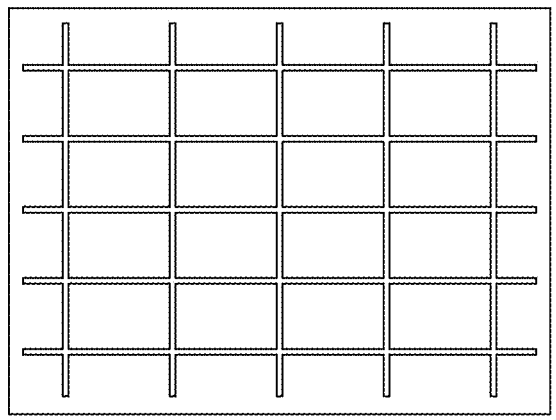
FIG. 1A shows a top view of a heating element in the form of a grid on a support.
Figure 1B:
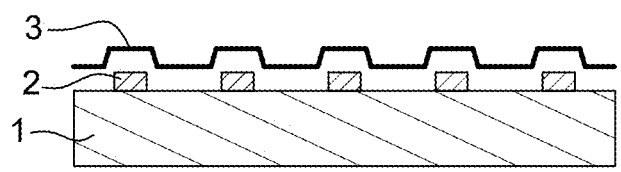
FIG. 1B shows a cross-section view of a heating element in the form of a grid on a support.

FIG. 1A shows a top view of the heating system (2) when it appears in the form of a grid resting on the support (1). As shown in the cross-section view of FIG. 1B, a dielectric layer (3) covers the heating system (2).

Figure 2A:
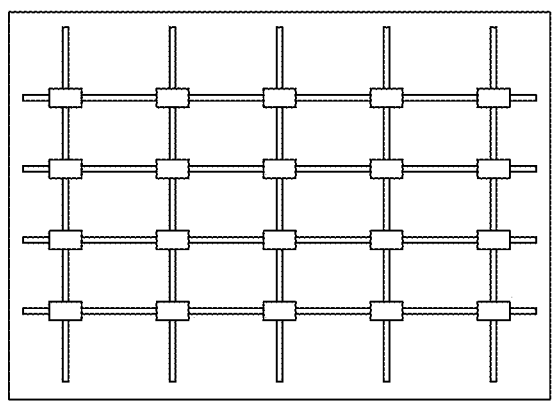
FIG. 2A shows a top view of a heating element in the form of pads on a support.
Figure 2B:
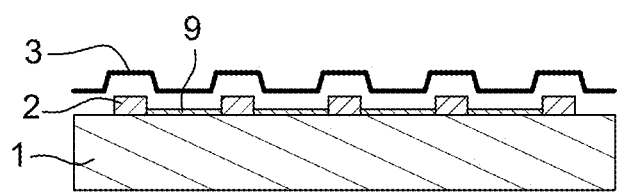
FIG. 2B shows a cross-section view of a heating element in the form of pads on a support.

FIG. 2A shows a top view of the heating system when it appears in the form of pads resting on the support (1). As shown in the cross-section view of FIG. 2B, a dielectric layer (3) covers the heating system (2). The pads are interconnected by the electric conductor (9) (FIG. 2B).

Figure 3:
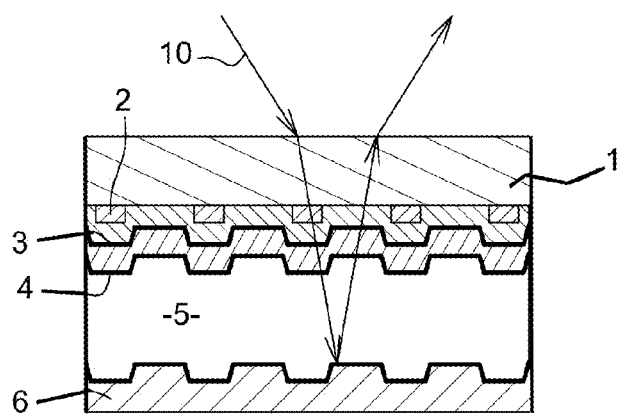
FIG. 3 shows an electrochromic superstrate-type device according to a specific embodiment of the present invention.

The electrochromic device illustrated in FIG. 3 is of superstrate type. It successively comprises:
- a support (1);
- a heating system (2);
- a dielectric layer (3);
- a first current collector (4);
- an electrochromic stack (5);
- a second current collector (6).

The electrochromic stack (5) comprises a first electrochromic electrode (advantageously optically active), an electrolyte, and a second electrochromic electrode (advantageously optically passive), which are not shown to avoid adversely affecting the clarity of the drawing.

According to this superstrate-type configuration, the support (1) of this device corresponds to the surface exposed to an electromagnetic radiation (10). The support (1) is thus transparent to electromagnetic radiation (10).

Figure 4:
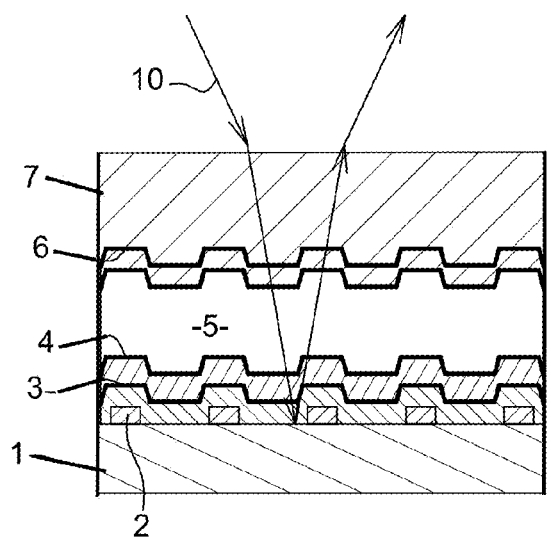
FIG. 4 shows an electrochromic substrate-type device according to a specific embodiment of the present invention.

The electrochromic device illustrated in FIG. 4 is of substrate type. It successively comprises:
- a support (1);
- a heating system (2);
- a dielectric layer (3);
- a first current collector (4);
- an electrochromic stack (5);
- a second current collector (6);
- an encapsulation layer (7).

The electrochromic stack (5) comprises a first electrochromic electrode (advantageously optically active), an electrolyte, and a second electrochromic electrode (advantageously optically passive) which are not shown to avoid adversely affecting the clarity of the drawing.

According to this substrate-type configuration, the support (1) of this device corresponds to the surface opposite to that exposed to an electromagnetic radiation (10). Advantageously, the support (1) reflects the electromagnetic radiation (10).

Figure 5:
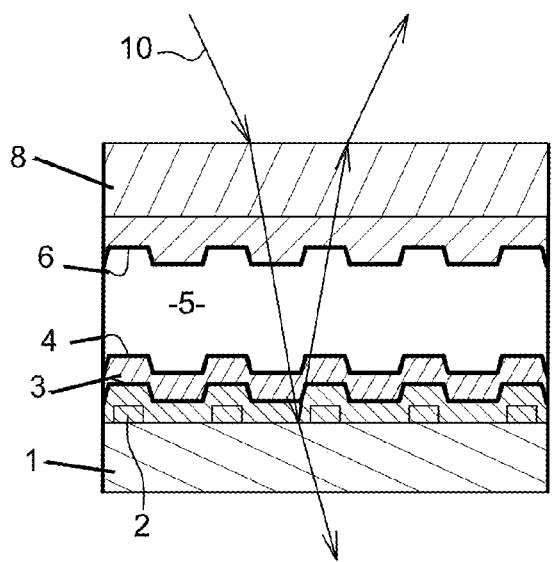
FIG. 5 shows an electrochromic dual-type device according to a specific embodiment of the present invention.
Figure 6:
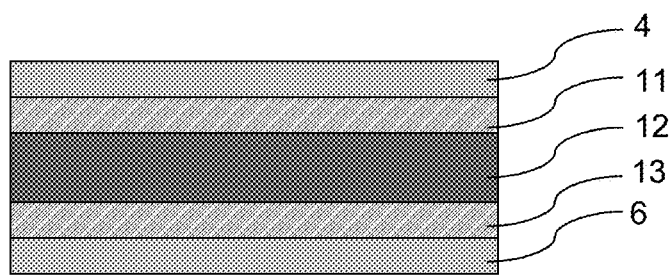
FIG. 6 shows a conventional electrochromic device without its support.

The electrochromic device illustrated in FIG. 5 is of dual type. It successively comprises:
- a support (1);
- a heating system (2);
- a dielectric layer (3);
- a first current collector (4);
- an electrochromic stack (5);
- a second current collector (6);
- a support (8).

The electrochromic stack (5) comprises a first electrochromic electrode (advantageously optically active), an electrolyte, and a second electrochromic electrode (advantageously optically passive), which are not shown to avoid adversely affecting the clarity of the drawing.

According to this dual configuration, the support (8) lets through the electromagnetic radiation (10), which has its optical properties modified by the electrochromic device.

On the other hand, the support (1), corresponding to the surface opposite to that which is exposed, may also let through the electromagnetic radiation (10), at least partly.

As shown in FIGS. 3 to 5, the optical properties of the electromagnetic radiation (10) are modified due to the electrochromic device.

Four electrochromic devices (INV-1 to INV-4) according to the present invention have been prepared. Their characteristics are described in Table 1.

TABLE 1

Electrochromic devices (INV-1 to INV-4)

|  | INV-1 (FIG. 3) | INV-2 (FIG. 3) | INV-3 (FIG. 4) | INV-4 (FIG. 5) |
|---|---|---|---|---|
| configuration | superstrate | superstrate | substrate | dual |
| lower support | sapphire | sapphire | sapphire | glass |
| grid (thickness) | W (0.2 μm) | TiN (5 μm) | TiN (0.2 μm) | NiCr (1 μm) |
| dielectric layer (thickness) | $SiO_2$ (1 μm) | $SiO_2$ (1 μm) | $SiO_2$ (1 μm) | $SiO_2$ (1 μm) |
| first current collector (thickness) | Cr (5 nm) | Cr grid (1 μm) | Cr grid (100 nm) | ITO (100 nm) |
| electrochromic stack |  |  |  |  |
| second current collector (thickness) | Al (1,000 nm) | Cu (1,000 nm) | Al (10 nm) | ITO (100 nm) |
| encapsulation layer (thickness) |  |  | polymer (5 μm) | glass (support) (1,000 μm) |

The electrochromic stack of these devices is formed:
- of a first $WO_3$ electrochromic electrode having a 0.4-μm thickness;
- of a LiPON electrolyte, having a 2-μm thickness;

of a second electrochromic electrode. It is made of $V_2O_5$, and has a 0.2-μm thickness.

What is claimed is:

1. An electrochromic device comprising an electrochromic stack and a support, said electrochromic stack successively comprising:
    a first current collector;
    a first electrochromic electrode;
    an electrolyte;
    a second electrochromic electrode;
    a second current collector;
    wherein the support and the electrochromic stack are separated by a dielectric layer and a heating system in contact with the support;
    wherein the heating system is sized to modify at least one optical characteristic of the electrochromic device; and
    wherein the heating system is partially transparent to infrared and/or ultraviolet radiation.

2. The electrochromic device of claim 1, wherein the heating system appears in the form of a structured monolayer or of a structured multilayer, to provide an optical diffusion and/or diffraction.

3. The electrochromic device of claim 1, wherein the heating system has a thickness in the range from 50 to 5,000 nanometers.

4. The electrochromic device of claim 1, wherein the heating system appears in the form of a grid; of interconnected lines; or of pads interconnected by an electric conductor.

5. The electrochromic device of claim 4, wherein the heating system has a space between lines or between pads in the range from 20 to 2,000 micrometers.

6. The electrochromic device of claim 4, wherein the heating system has a line or pad width in the range from 0.2 to 20 micrometers.

7. The electrochromic device of claim 4, wherein the heating system has a thickness/space between lines or between pads ratio in the range from 0.2 to 50.

8. The electrochromic device of claim 4, wherein the heating system has a space between lines or between pads in the range from 50 to 200 micrometers.

9. The electrochromic device of claim 4, wherein the heating system has a line or pad width in the range from 5 to 10 micrometers.

10. The electrochromic device of claim 1, wherein the heating system is made of a material selected from the group consisting of Cr; Ni; NiCr; Ta; W; Mo; Pt; TiN; TiAlN; TaN; $RuO_2$; bismuth ruthenate; and bismuth iridate.

11. The electrochromic device of claim 1, wherein the electrochromic stack is covered with an encapsulation layer.

12. The electrochromic device of claim 1, wherein the dielectric material is selected from the group consisting of $SiO_2$; SiN; $TiO_2$; AlN; and $Al_2O_3$.

13. The electrochromic device of claim 1, wherein the dielectric material is AlN.

* * * * *